(12) United States Patent
Krasadakis et al.

(10) Patent No.: US 10,762,140 B2
(45) Date of Patent: Sep. 1, 2020

(54) IDENTIFYING CONTENT IN A CONTENT MANAGEMENT SYSTEM RELEVANT TO CONTENT OF A PUBLISHED ELECTRONIC DOCUMENT

(71) Applicant: Microsoft Technology Licensing, LLC, Redmond, WA (US)

(72) Inventors: Georgios Krasadakis, Dublin (IE); Oleksiy Shepetko, Dublin (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 486 days.

(21) Appl. No.: 15/342,063

(22) Filed: Nov. 2, 2016

(65) Prior Publication Data

US 2018/0121551 A1 May 3, 2018

(51) Int. Cl.
*G06F 16/93* (2019.01)
*G06F 16/332* (2019.01)

(52) U.S. Cl.
CPC .......... *G06F 16/93* (2019.01); *G06F 16/3322* (2019.01)

(58) Field of Classification Search
CPC ... G06F 17/2785; G06F 17/271; G06F 17/277
See application file for complete search history.

(56) References Cited

U.S. PATENT DOCUMENTS 7,698,270 B2   4/2010 Brave et al.
7,725,487 B2   5/2010 Nadamoto et al.
8,171,011 B2   5/2012 Szulczewski
8,713,438 B1   4/2014 Broniek et al.
8,914,367 B2  12/2014 Toebes et al.
(Continued)

FOREIGN PATENT DOCUMENTS

WO    2007146198 A1   12/2007

OTHER PUBLICATIONS

Liu, et al., "Personalized News Recommendation Based on Click Behavior", in Proceedings of the 15th international conference on Intelligent user interfaces, Feb. 7, 2010, pp. 31-40.

*Primary Examiner* — Jay A Morrison
*Assistant Examiner* — Ken Hoang
(74) *Attorney, Agent, or Firm* — Alleman Hall Creasman & Tuttle LLP

(57) ABSTRACT

A computer system receives a published electronic document from a first source. The computer system analyzes structure and content of the published electronic document to extract information. Such extracted information can include keywords, based on content, and information indicative of relative importance of those keywords, based on structure. The computer system generates queries based on the extracted information to query a content management system of a second source of published electronic documents. The results can indicate whether the content management has content available corresponding to the query, and whether the content is published in electronic documents available from the second source. The computer system can process these results received from queries, using the relative importance of the extracted information, to communicate information indicative of content available in the content management system and relevant to the published document and not yet published in electronic documents available from the second source.

20 Claims, 8 Drawing Sheets

(56) References Cited

U.S. PATENT DOCUMENTS

| | | |
|---|---|---|
| 9,195,640 B1 * | 11/2015 | Donneau-Golencer .................... G06F 17/28 |
| 2008/0079573 A1 * | 4/2008 | Bloebaum ............ H04B 5/0031 340/568.1 |
| 2008/0195462 A1 | 8/2008 | Magdon-Ismail et al. |
| 2008/0294788 A1 * | 11/2008 | Wu ......................... H04L 12/56 709/231 |
| 2010/0064040 A1 | 3/2010 | Wise et al. |
| 2011/0238688 A1 * | 9/2011 | Mercuri ................ G06F 16/958 707/769 |
| 2012/0084636 A1 | 4/2012 | Sengamedu et al. |
| 2012/0089621 A1 | 4/2012 | Liu et al. |
| 2012/0311139 A1 | 12/2012 | Brave et al. |
| 2013/0166377 A1 | 6/2013 | Kirkby et al. |
| 2014/0372563 A1 | 12/2014 | Ke et al. |
| 2015/0112996 A1 * | 4/2015 | Mishra ................ G06F 16/2228 707/741 |
| 2015/0170172 A1 | 6/2015 | Gichuhi |
| 2015/0261874 A1 | 9/2015 | Sampath-Kumar et al. |

\* cited by examiner

Content Management Database 200

Item 1 - 202
    ID - 204
    file name - 206
    Metadata - 208
...
Item N – 202
...

FIG.2

Electronic Document 300

Section 1 - 302
    type - 310
    attribute 1 - 312
    ...
    attribute N
    Content 1 - 306
    Subsection 1 – 304
        Content a – 308
        ...
    ...
    Subsection N
        ...
...
Section N – 302
    ...

FIG. 3

IDENTIFYING CONTENT IN A CONTENT MANAGEMENT SYSTEM RELEVANT TO CONTENT OF A PUBLISHED ELECTRONIC DOCUMENT

BACKGROUND

Commercial publishers commonly research content that others have published. Such research is particularly common for content, such as for news and entertainment, published on the internet, or "online". For example, in news and entertainment, commercial publishers need to ensure that content available from them online is interesting to potential viewers, and otherwise up-to-date.

For example, each major commercial news outlet typically has a "home page" on the internet on which it publishes headlines for major stories of the moment. The home page generally has many headlines, which typically are hypertext links that can be used to access a full story. In some cases, a few sentences may be provided on the home page. The organization of the headlines on the home page generally changes several times per day as new stories become available, and older stories become less frequently viewed. Thus, online content from commercial publishers, particularly in news and entertainment can change very quickly.

For a commercial publisher to identify content published online by other publishers, and to compare such content to its own resources, a challenging task is presented due to the high volume of content, rapid change of content and limited access to content. A large amount of time and computer resources can be consumed by users in reviewing online content and content stored in their content management systems.

SUMMARY

This Summary is provided to introduce a selection of concepts in a simplified form that are further described below in the Detailed Description. This Summary is intended neither to identify key or essential features, nor to limit the scope, of the claimed subject matter.

Several technical challenges arise for a commercial publisher to compare content published online by other publishers to its own resources. In particular, the content published by other publishers is only available to the commercial publisher in its published format, such as through a "home page" of a web site. Thus, any analysis of the published content available from another publisher is based on the structure and content of a published electronic document. A commercial publisher generally does not have access to a database of content, and various metadata about that content, owned by other competing commercial publishers. Thus, a computer-based analysis of what another publisher's content involves extracting information based on the structure and content from a published electronic document, typically a home page.

The extracted information is used to generate queries to find relevant content in a content management system. Results from such queries are processed to communicate to a user whether the content management has content available corresponding to the query and relevant to the published electronic document, and whether the available content is published in electronic documents available from the second source. When the query results are processed based on the relative importance of the information extracted from the published document, the communication to users can include indications of the relative importance of the query results, thus allowing the users to focus their attention on the more important content, and reduce consumption of computer resources, such as processing and network bandwidth.

Accordingly, in one aspect, a computer system receives a published electronic document from a first source of published electronic documents. The computer system analyzes structure and content of the published electronic document to extract information, and data indicative of relative importance of the extracted information. Such extracted information can include keywords, based on content, and information indicative of relative importance of those keywords, based on structure.

The computer system generates queries based on the extracted information to query a content management system of a second source of published electronic documents. The results can indicate whether the content management has content available corresponding to the query, and whether the content is published in electronic documents available from the second source.

The computer system can process these results received from queries, using the relative importance of the extracted information, to communicate information indicative of content available in the content management system and relevant to the published document and not yet published in electronic documents available from the second source. This information for several purposes to reduce consumption of computer resources, and otherwise improve productivity of users and reduce the amount of time for making content available for distribution.

In the following description, reference is made to the accompanying drawings which form a part hereof, and in which are shown, by way of illustration, specific example implementations. Other implementations may be made without departing from the scope of the disclosure.

BRIEF DESCRIPTION OF THE DRAWINGS

FIG. 2 is a schematic diagram of an illustrative example of a simplified database schema for a content management system.

FIG. 3 is a schematic diagram of an illustrative example of a simplified electronic document with structure and content.

Figure 1:
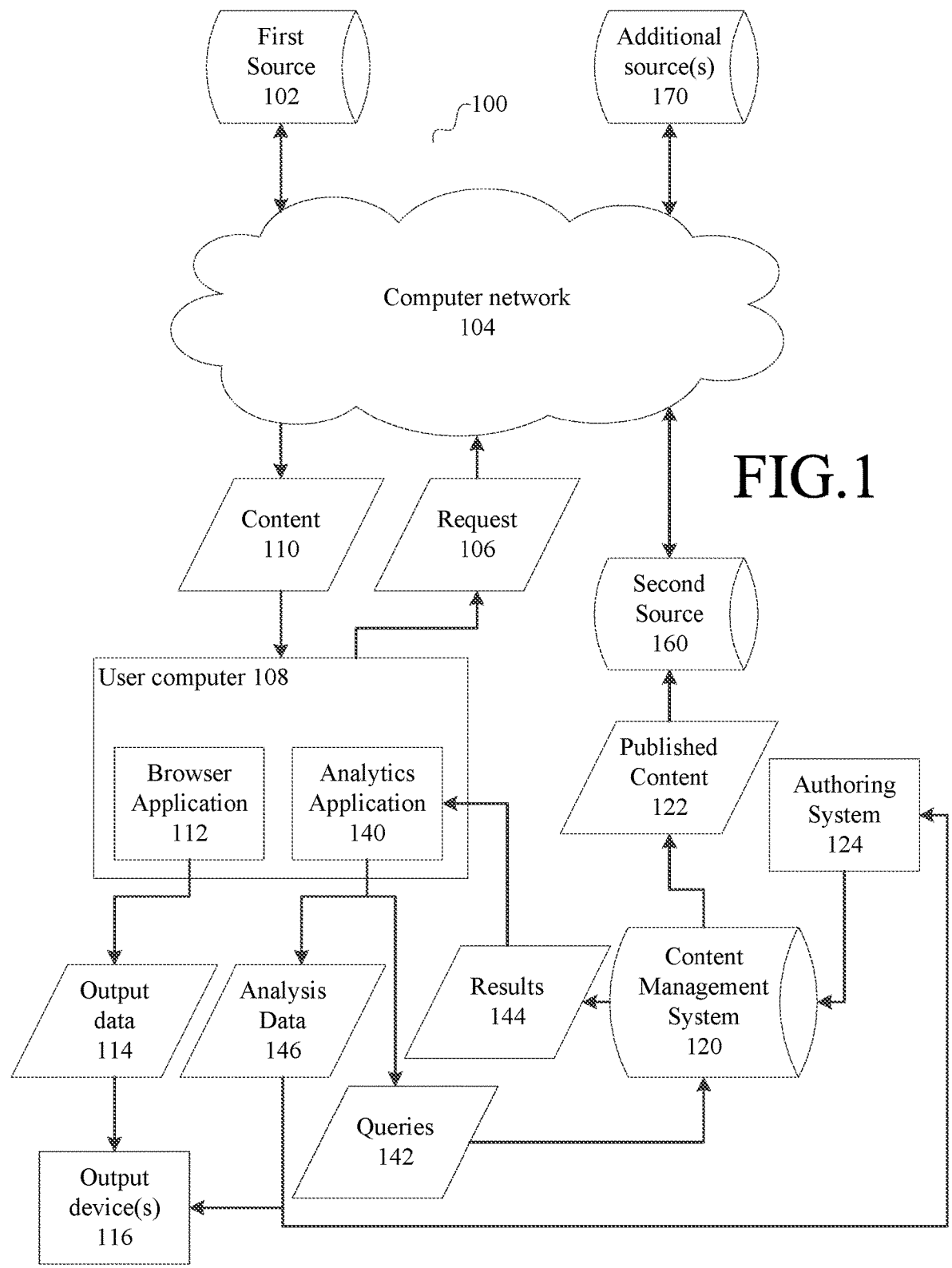
FIG. 1 is a combined block diagram and data flow diagram of an example computer system that compares published electronic documents from a first source to content in a content management system for publishing electronic document through another source.
Figure 6:
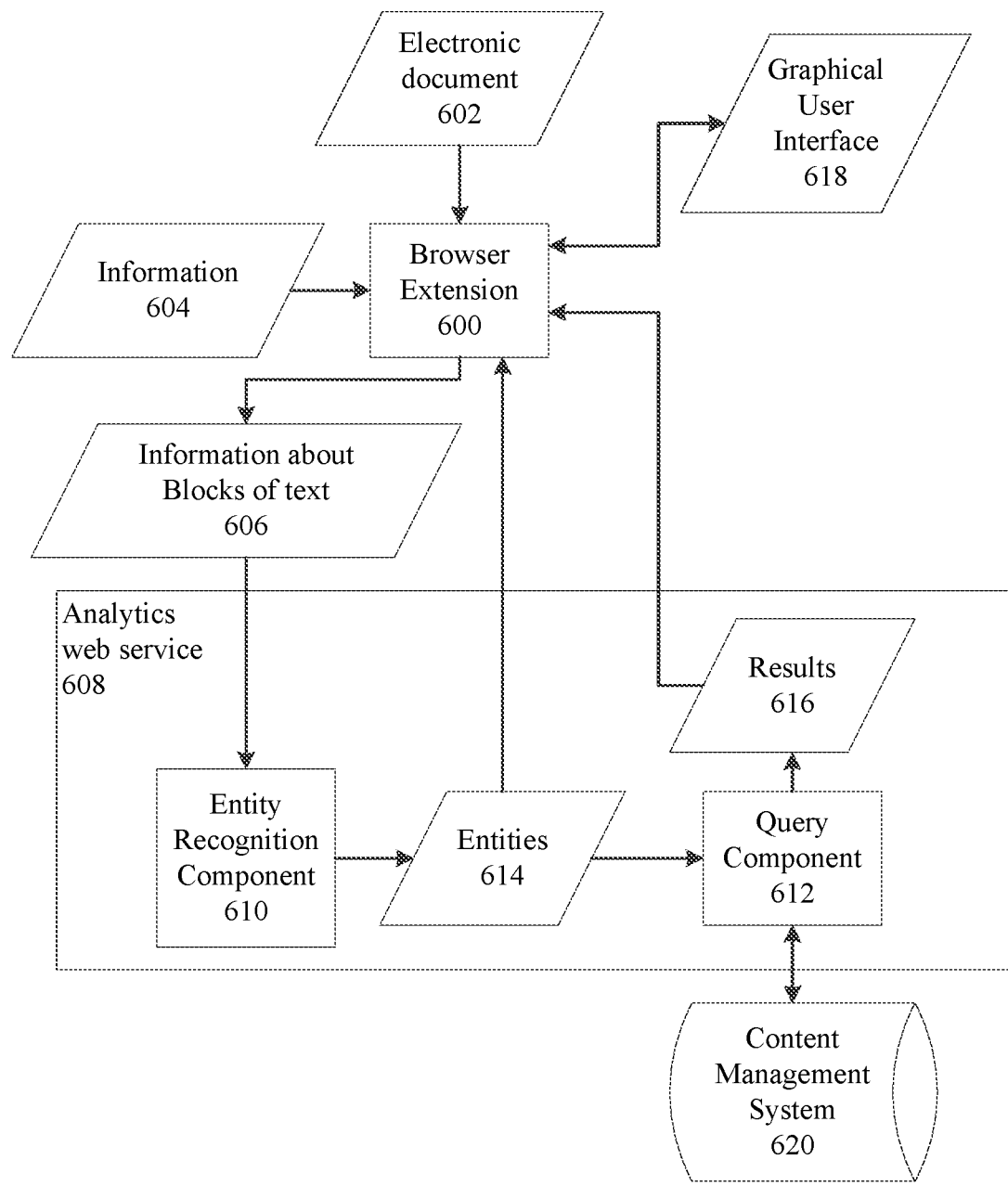
FIG. 6 is a combined block diagram and data flow diagram of an example implementation of the analytics application of FIG. 1, using web services.

In the data flow diagrams of FIGS. 1 and 6, a parallelogram indicates data, whereas a rectangle indicates a module or component of a computer that performs processing on data.

DETAILED DESCRIPTION

FIG. 1 is an illustrative example of a computer system that compares a published electronic document, from a first source, to content in a content management system, used for publishing electronic documents through a second source.

In FIG. 1, a computer system 100 includes a first source 102 of published electronic documents. A source of published electronic documents, as used herein, is a computer on which electronic documents are published and from which the electronic documents can be retrieved over a computer network 104. Such electronic documents are defined by data, in digital form, representing structure and content. The data representing structure is used by a computer to arrange and format content spatially and/or temporally for presentation on an output device. The data representing content includes data of one or more types, such as text and media data, including but not limited to photos, videos and audio, in digital form. Electronic documents may be stored in data files or databases at the source of published content. Electronic documents also can be transmitted as data over computer networks. Such data also can be stored in data structures in memory devices.

The computer network 104 shown in FIG. 1 is merely schematic and illustrative. The actual network topology can be any kind of computer network topology. Some of the computers may communicate with each other over a local area network, whereas others may communicate with each other over a wide area network, and the computer network can include a combination of both private networks, including both wired and wireless networks, and publicly-accessible networks, such as the Internet.

FIG. 1 also illustrates a second source 160 and one or more additional source(s) 170 of published electronic documents. The computer system can include any number of sources of published electronic documents. Each of the various sources 102, 160 and 170 of published electronic documents in FIG. 1 can be implemented using a general purpose computer, such as described in more detail below in connection with FIG. 9, for example, a server computer executing web server software.

The sources 102, 160 and 170 of published content, in response to requests 106 from a user computer 108, deliver content 110 over the computer network 104 to the user computer 108. A user computer 108 can be implemented using a general purpose computer such as described below in connection with FIG. 9. Generally speaking, the content 110 is an electronic document specified by a resource identifier for the electronic document, such as a uniform resource locator (URL), a uniform resource identifier (URI), a globally unique identifier (GUID), or other identification information in the form of an identifier.

The user computer 108 send requests 106 with such resource identifiers and receives the content 110 corresponding to the requested resource identifier. The user computer 108 processes the received content 110 with an application program, such as a browser application 112. Example browser applications include, but are not limited to, the Edge browser and the Internet Explorer browser available from Microsoft Corporation, the Safari browser available from Apple Computer, Inc., the Chrome browser available from Google, the Mozilla Firefox browser, and the Opera browser. The browser application 112 presents the content as output data 114 to a user through one or more output devices 116.

An output device can be any device or combination of devices that displays images (e.g., photos or videos or computer generated animation) and/or presents sound (e.g., music, recorded dialog, sound effects), such as displays and/or speakers, or other devices, such as a set top box or game console or smartphone or virtual reality device or augmented reality device, which communicates with the computer and receives and processes output data from the computer for presentation on the output devices.

Turning now to the second source 160, published content 122 is provided to the second source 160 by a content management system 120. The content management system stores electronic documents and information about those electronic documents in a database. An illustrative example of such a database is described in more detail below in connection with FIG. 2. Data files for the electronic documents generally are stored in a file-based storage system, of which a large number are commercially-available. The content management system can be implemented based on conventional storage techniques and data management technologies, such as a relational database, an object-oriented database, a graph database, and structured data stored in data files, and the like.

The content management system can be associated with an authoring system 124, through which a user can browse, search, select, edit, create, and delete entries or objects in the content management database. Generally speaking, an electronic document is associated with a resource identifier, such as a uniform resource locator (URL), uniform resource identifier (URI), globally unique identifier (GUID) or other identification information in the form of an identifier. The second source 160 receives the resource identifier and uses the resource identifier to access data from the content management system to create the electronic document and transmit the electronic document to a user computer, such as a user computer 108.

The first source 102 and any other sources 170 of published electronic documents may also be supported by a content management system similar to the content management system 120 used to support the second source 160. However, it is presumed that, in the context of the technical problems discussed below, the users who have access to the content management system 120, for the purpose of publishing content through the second source 160, are users that do not have access to any content management system from the first source 102 or other sources 170. Instead, any knowledge of the content available from the first sources 102 and other sources 170 by such users is through the user computer 108, by making requests for electronic documents based on a resource identifier for the electronic document, such as a uniform resource locator (URL), a uniform resource identifier (URI), globally unique identifier (GUID), or other identification information in the form of an identifiers.

The user computer 108 also includes an analytics application 140. The analytics application is described in more detail below in connection with FIGS. 4-8. The analytics application allows the user computer 108 to compare the content of a published electronic document received from the first or additional source (e.g., 102 or 170) to content available in the content management system 120, to identify relevant content in the content management system. The result of such a comparison can be provided to a user or a computer, and can be used for many purposes.

The analytics application 140 extracts information based on the structure and content of the published electronic document received from the first or other source, and generates queries 142 to the content management system 120 used by the second source. Results 144 of applying the queries to the content management system 120 are processed by the analytics application 140 into analysis data 146, examples of which are described in more detail below. Such analysis data can be displayed on the output devices 116 of the user computer 108 adjacent to displayed content of the electronic document. Such information can also be provided to the authoring system 124 or other tools used by users of the content management system 120 to create published content 122.

Generally speaking, the analytics application 140 running on the user computer 108 receives a published electronic document from a first source 102 of published electronic documents. The analytics application 140 running on the user computer 108 analyzes structure and content of the published electronic document to extract information, and data indicative of the relative importance of the extracted information. Such extracted information can include keywords, based on content, and information indicative of relative importance of those keywords, based on structure.

The analytics application 140 running on the user computer 108 generates queries 142 based on the extracted information to query a content management system 120 of a second source 160 of published electronic documents. The results 144 can indicate whether the content management system 120 has relevant content available corresponding to the query 142, and whether the content is used in electronic documents published through the second source 160. The analytics application 140 running on the user computer 108 can process results 144 received from those queries for several purposes. For example, the analytics application can communicate, to a user of the analytics application, information indicative of content available in the content management system and relevant to the published document and not yet published in electronic documents available from the second source After briefly describing illustrative examples of a content management system and of an electronic document, in connection with FIGS. 2 and 3, how the analytics application processes the electronic document to query the content management system will be described in more detail in connection with FIGS. 4-8.

Turning now to FIG. 2, an example implementation of a database 200 for a content management system will now be described. A content management system can be implemented using commercially available software designed for the purpose of managing content used to maintain a web site. Examples of such commercially available software include but are not limited to SharePoint content management system from Microsoft Corporation, Documentum content management system from EMC Corporation and Web Content Management System from OpenText. Such content management systems have a wide variety of complexity and information stored. Thus, it should be understood that the following is a simplified illustrative example of a content management system database and is not intended to be limiting.

A content management system 120 stores data representing content and/or structure that can be used for electronic documents to be published through the second source 160. Data that represents structure can include a data file for a template for an electronic document, such as a particular style or layout of a page. Data that represents content can include text for a story, image data, a video or the like. Such data is referred to as an item 202 in the database 200 of the content management system. For each item 202, the database stores an identifier 204 for the item. The item may include a file name 206 of a data file that stores data corresponding to the item. For example, if item 202 represents an image, then file name 206 may be a file name for a file in storage (not shown) that stores the image data. The item may store a resource identifier for the item if the item is accessible through the source 160.

The item 202 also has metadata 208 stored about the item. Such metadata 208 can include a variety of information. For example, metadata 208 can include a title or other text description or label for the item. Metadata 208 can include tag data, such as keywords or other data to allow structured searching. Metadata 208 can include use information, such as whether the item is used in an electronic document, whether that electronic document is currently published through the source 160 (FIG. 1), expected life time, and any usage statistics relative to the item, such as its predicted or actual performance in terms of numbers of views, impressions, viewing time and the like. Metadata 208 can include technical data about the item, such as resolution and format information for image and video data, such as frame rate, raster size, color format, pixel bit depth, file format and the like. Metadata 208 can include time information and location information relating to the origin of the item, such as a time and/or geographical location at which an image was captured.

These example data structures can be implemented in a relational database, object oriented database, graph database, structured data stored in data files, and the like, when stored in persistent storage.

Users of the content management system 120 create electronic documents for publication through the second source 160. To assist users in creating electronic documents, the user computer 108 includes the analytics application 140 which compares content published from a first source 102 to content available in the content management system 120. However, the content accessible from the first source 102 is in the form of a published electronic document. For example, the electronic document may be a "home page" of a web site accessible over the internet.

Referring now to FIG. 3, an illustrative example of such an electronic document will now be described. An electronic document generally includes data defining structure of the document and data defining content. The electronic document generally conforms to a standard called a "document object model" so that a browser application (112, FIG. 1) can process electronic documents from multiple sources. In some cases the standard to which the electronic document conforms is a form of markup language such as a form of the hypertext markup language (HTML). Such document object models and markup language formats allow for a wide variety of potentially very complex structures for electronic documents. For the purposes of explaining the analytics application 140, a simplified example of an electronic document is shown in FIG. 3.

Generally, the data defining the structure of the electronic document defines a hierarchical structure such that the electronic document 300 has one or more sections 302. Each section 302 typically includes one or more further subsections 304 and/or one or more items 306 of content. A subsection 304 typically includes one or more further subsections (not shown) and/or one or more items 308 of content. Sections and subsections typically have a type 310 and one or more attributes 312. Thus it is possible to identify sections of a particular type (such as a header, title, or paragraph), and/or with a particular attribute.

In a computer system such as described in FIG. 1, in connection with a content management system 120 for a second source 160 of published content such as described in FIG. 2, and given an electronic document from a first source 102 of published content such as described in FIG. 3, an illustrative example of an implementation of an analytics application 140 will now be described in connection with FIGS. 4-8.

In this example, the analytics application 140 can be implemented as a "plug-in", or "add on", or "extension" to the browser application 112. Generally such an extension to the browser application has access to at least data for a currently viewed electronic document that is being processed by the browser application.

Figure 4:
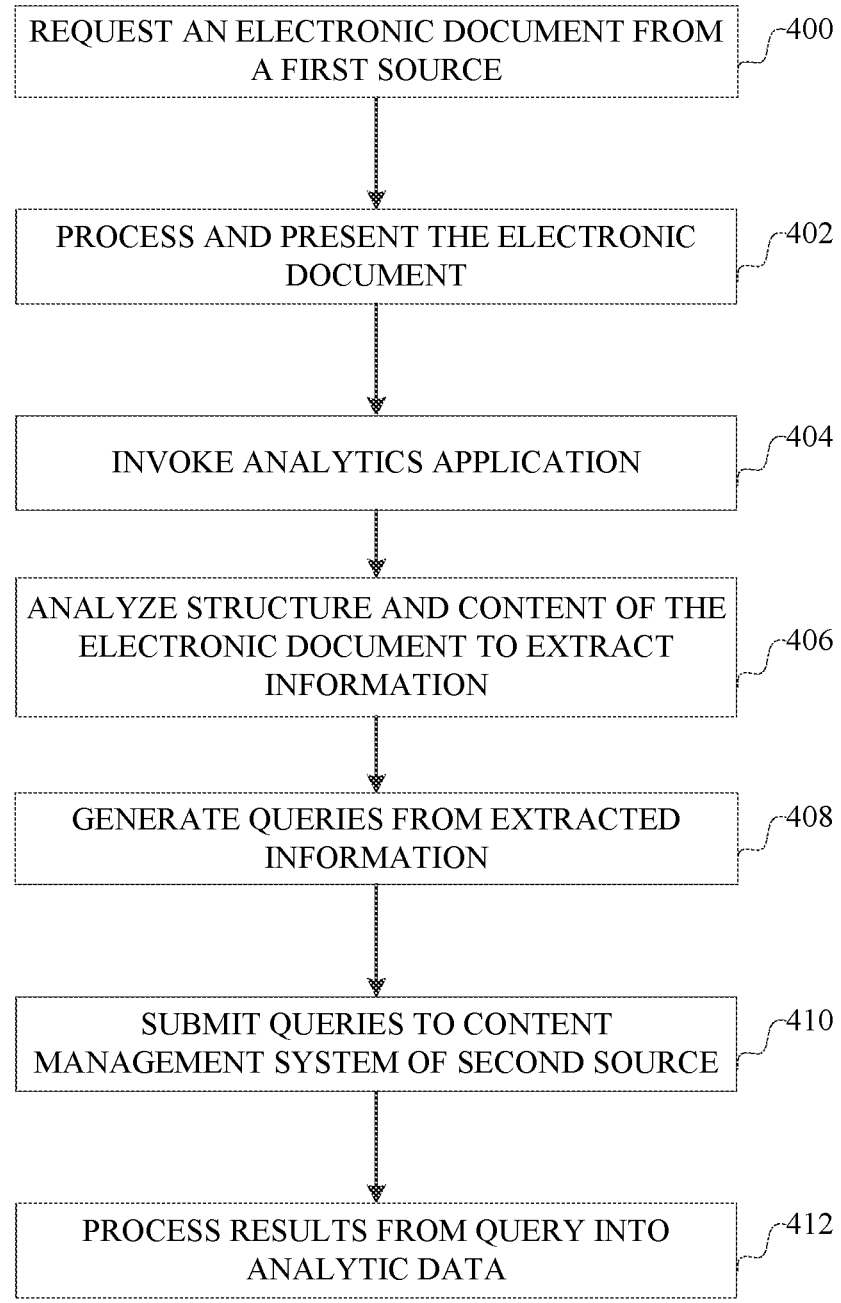
FIG. 4 is a flowchart describing an example implementation of a mode of operation of the computer system of FIG. 1.

Referring now to FIG. 4, a first example of operation of the analytics application will now be described.

The browser application requests 400 an electronic document from a first source (102, FIG. 1) of published content. In general, a user initiates a request for a particular electronic document, such as a home page, which the user would like to compare with the content in the content management system (120, FIG. 1). After receiving the electronic document, the browser application processes and presents 402 the electronic document on the output device(s) (116, FIG. 1).

In response to user input or automatically, the analytics application is invoked 404. The analytics application analyzes 406 structure and content of the published electronic document to extract information. Such extracted information can include, for example, keywords, based on content, and information indicative of relative importance of those keywords, which may be based on structure or other information. The extracted information is not limited to any particular kind of data, and can include as much information as may be useful to query the content management system and/or to rank results and measure coverage by the items in the content management system. Thus, such information can include but is not limited to entities, titles, subtitles, keywords, languages, locale, sentiment, the style of the document, resource identifiers and any additional elements that are available in the electronic document.

The analytics application generates (408) queries based on the extracted information and then submits 410 such queries to the content management system 120 of second source 160. The results can indicate whether the content management system 120 has content available corresponding to the query, and whether the content is used in electronic documents published through the second source. The analytics application then processes 412 results received from the query into analytic data which can be used for several purposes.

An example implementation of the analytic data will now be described, in connection with FIG. 5, by way of an example graphical user interface for the analytic application. The graphical user interface presents information to a user about the results of querying the content management system based on information extracted from the electronic document.

The example graphical user interface 500 for the analytics application can be presented adjacent to, or overlapping with or generally near a window 502 or other display area of the browser application. A purpose of the graphical user interface 500 is to present information about the subject matter of the electronic document in the browser application in a way that conveys the relative importance of the subject matter in the electronic document as well as the availability of content related to that subject matter in the content management system (120, FIG. 1).

Figure 5:
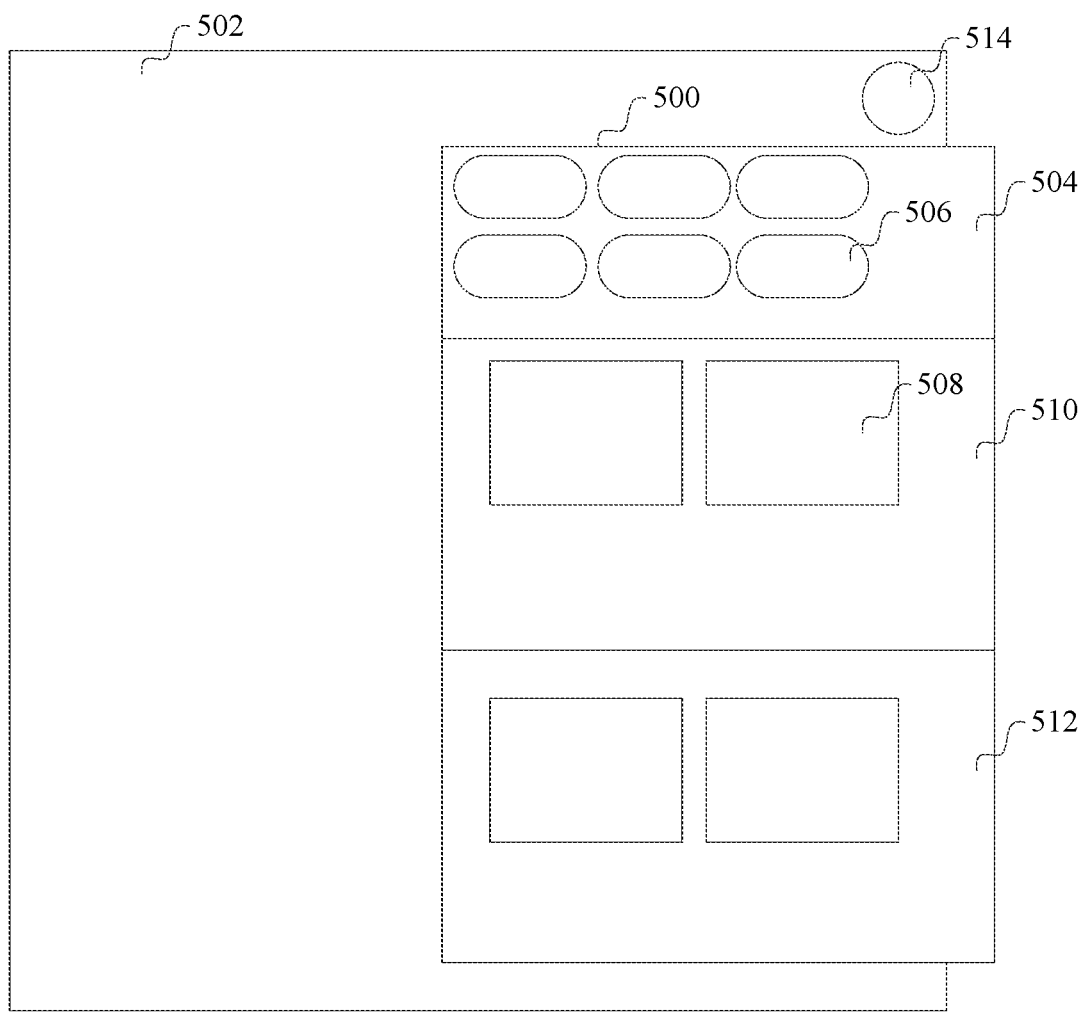
FIG. 5 is a diagram of an illustrative example of a graphical user interface for viewing results of a comparison of an electronic document to a content management system.

In the example in FIG. 5, the graphical user interface 500 includes a first pane 504 which includes several graphical elements 506. Each graphical element 506 represents a concept found in the subject matter of the electronic document shown in the browser application. In this example, each graphical element has a shape with a color and an overlay of text, representing an entity. Multiple graphical elements 506, representing multiple different entities, are presented in an order based on relative importance of the entities in the electronic document.

A content pane 508 includes representative content for items found in the content management system and corresponding to the subject matter of the electronic document. In this example, in response to a selection of a graphical element 506, content from the content management system related to the entity represented by the selected graphical element, is retrieved and displayed. The content pane 508 can be divided into two panes, with a first pane 510 showing content already published on the second source 160, and a second pane 512 showing content available in the content management system but not yet published through the second source 160.

The browser application also can be configured to present state information generated by the browser extension. For example, the browser extension can provide a state indicator 514 corresponding to how well the subject matter of the electronic document is covered by content in the content management system. An example of how to compute a value indicative of that state is described in more detail below in connection with FIG. 8. In response to selection of this state indicator, the graphical user interface 500 of the browser extension can be activated.

The graphical user interface 500 also can be responsive to user input to provide a variety of operations to an end user. For example, in response to a user input with respect to a displayed item, the browser extension can invoke the content management system to present the item on the display.

To generate a graphical user interface such as shown in FIG. 5, the process of FIG. 4 can used to extract entity information from content of the electronic document, to extract relative importance of the entities from where references to the entities are found in the structure of the electronic document, and to use this entity information to query the content management system.

More details of an example implementation of extracting information (406, FIG. 4) will now be described in connection with FIGS. 6 and 7.

Referring to FIG. 6, a data flow diagram of an example implementation of the analytics application will now be described.

In FIG. 6, a first component, herein called a browser extension 600, receives the electronic document 602 as accessed by the browser application (112, FIG. 1). The browser extension 600 parses the electronic document 602 using information 604 about the structure of the electronic document, such as information about the particular document object model or markup language standard used for the document. This information 604 can be general for any electronic document or specifically-designed based on some predetermined information about the structure of the electronic document. This information 604 for example, can be information indicating data in the electronic document which identifies a headline for a story, or which identifies different sections of a page, and so on. The information 604 can be stored in a data file which is an input to the browser extension 600, or can be part of the computer program instructions defining the browser extension 600.

The browser extension uses the information 604 to identify blocks of text in the electronic document, and to rank the identified blocks of text. FIG. 6 illustrates this as information 606 about the blocks of text, which includes the blocks of text and ranking information for the blocks of text. The blocks of text can be, for example, each headline in the electronic document. The ranking information for each block of text can be a score that is a function of data about the block of text, such as its position in the electronic document, its position on a display area when the electronic document is displayed, the tag for the structural element containing the headline, and/or other data.

The browser extension 600 can be implemented, for example, using a plug-in or extension language used by the browser application, such a JavaScript, Java, .Net and the like. The browser extension 600 also can be implemented to access web services, which are programs executing on server computers remote from the user computer 108 executing the browser application 112. Other components of this example implementation of the analytics application, as described below, can be implemented as web services applications accessible by the browser extension 600. Thus the browser extension can be configured with authorization information, such as login information such as a user name and password, to connect with the content management system and/or other web services.

The analytics application also can include an analytics web service 608 with which the browser extension 600 communicates. The analytics web service 608 provides a way for the browser extension 600 to invoke further processing on the information about the blocks of text 606. The analytics web service can include, or can further access other web services implementing, an entity recognition component 610 and a query component 612.

The entity recognition component 610 receives, as an input, the information about the blocks of text 606. As an output, this component provides information about entities 614, such as a list of entities and related information, found in the blocks of text 606. An entity is essentially a keyword that is a noun or noun phrase. Other keywords of other grammatical types also could be extracted. The information related to the entities can include, for example, ranks or scores for the entities. The scores can be based on, for example, frequency of occurrence of the word in a block of text, other statistics about a word in the electronic document, the ranking information received from the browser extension 600, and/or other information. An example computer program that can be used to implement at least part of the entity recognition component is a text analytics or entity recognition application such as the Stanford Named Entity Recognition application, or the Text Analytics API of the Cognitive Services offering of the Azure service from Microsoft Corporation.

The query component 612 receives, as an input, the information about entities 614 and uses keywords from this information to query a content management system 620. In response to the query from the query component 612, the content management system provides, for each entity, identifiers for items in the content management system that match the entities 614. The response to the query also can include related content of the matching items. The results 616 and information about entities 614 are returned to the browser extension 600.

Given the architecture of the analytics application as a browser extension and web service, multiple different user computers for different users can use the same analytics web service 608. In such an implementation, the information about entities 614 and results 616 can be stored for an electronic document in a manner accessible to the analytics web service 608. The browser extension 600 can provide an identifier of an electronic document to the analytics web service 608, which in turn can provide previously computed information to the browser extension 600. If the electronic document and previously computed information also are time stamped in some manner, the system can determine whether the electronic document has been modified since it was last processed by the analytics web service 608.

Figure 7:
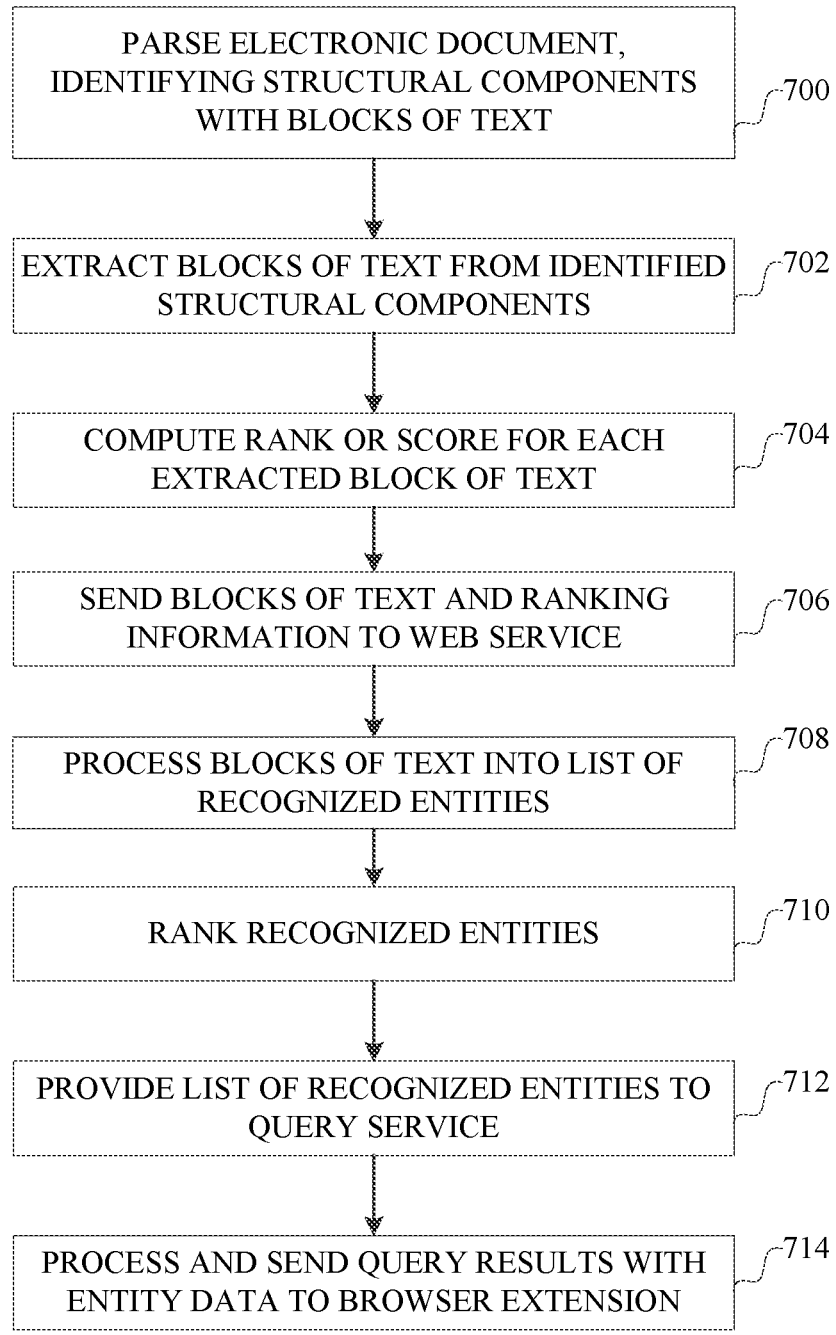
FIG. 7 is a flowchart describing an example implementation of extracting information from an electronic document.

Turning now to FIG. 7, a flowchart of the operation of this example implementation will now be described.

A browser extension parses 700 the electronic document to identify structural components of the electronic document which contain blocks of text of interest. For example, when processing a news page, the browser extension may identify each structural component that represents a headline. For each such identified structural component of the electronic document, a block of text is extracted 702. For each such block of text, a score or rank is computed 704, based on, for example, relative or absolute position of the text in the document, type or attribute, such as font or styling, of structural component containing the text, or other information related to the block of text. Several values related to rank or importance can be gathered for each block of text. The browser extension then sends 706 this information, i.e., the blocks of text and related ranking information, to the analytics web service.

The analytics web service processes 708 each block of text using a form of entity or keyword extraction, providing a list of entities and/or keywords for the electronic document. Using the information received from the browser extension, and statistics about the occurrence of the entities and/or keywords in a block of text and/or in the electronic document generated by the text analysis, the entities and/or keywords can be ranked 710. The analytics web service provides 712 the entities to a query component, which queries the content management system. Results from the queries are processed and sent 714 to the browser extension.

The query to the content management system can be one or more queries designed to retrieve, for each entity, relevant items from the content management system having metadata matching the entity (e.g., metadata 208 in FIG. 2). For each entity, a set of items is returned from the content management system, including at least identifiers and relevant metadata for those items. The search may limit the set of items from being unduly large in several ways, such as by setting a threshold on the number of items, and filtering or ranking the items based on whether they are currently published through the source (160, FIG. 1), or date of creation or last modification, or the type of the item. For example, a full story including text and video published by the source 160 may be selected instead of, or given priority over, items that may be considered raw sources for a story, such as a stock image of an individual. The results from the search are processed by the analytics web service 608.

More details of an example implementation of processing results (412, FIG. 4) from the query to the content management system will now be described in connection with FIG. 8.

Figure 8:
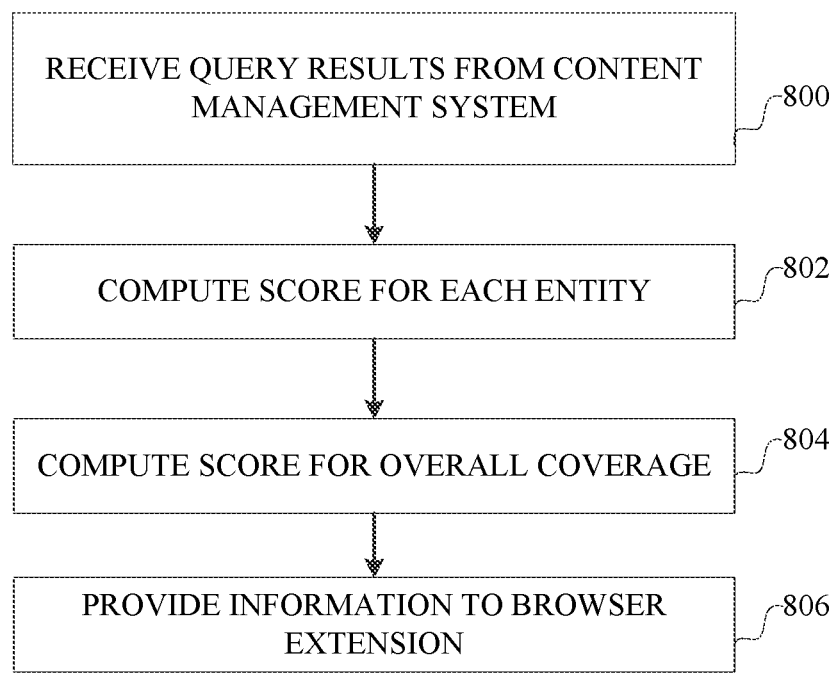
FIG. 8 is a flowchart describing an example implementation of processing of results from querying a content management system.

In FIG. 8, search results are received 800 from the content management system, including, for each entity (keywords) a set of item identifiers from the content management system and associated metadata. The analytics web service uses the list of entities, their relative importance, and the results from the queries to computes 802 a score for each entity, indicating how well the entity is represented by content stored in the content management system. The individual scores can be used to compute 804 a score representing how well the content of the electronic document overall is covered by content in the content management system.

As one example, the analytics web service can compute, for each entity, a score based on whether the entity has corresponding currently published content, or content available that is not published, or no content available. The score may be based on a number of items or the types of items that are available that match the entity. A raw score can be compared to a threshold to provide a final score for the entity.

As one example, the score representing how well the content of the electronic document overall is covered by content in the content management system can be considered a percentage of the content overlap. The value or score computed for each entity can be weighted, for example based on the rank of the entity. These weighted values can be summed. This sum can be compared to a maximum possible value to obtain the percentage representing the content overlap.

The analytics web service can provide 806 the list of ranked entities, corresponding scores, and overall scores, along with the results from the query, back to the browser extension. The browser extension can present the results, for example using the graphical user interface shown in FIG. 5. A variety of operations can then be made available to a user through such a graphical user interface. For example, such operations can include allowing a user to filter the view of the results corresponding to an entity, to access and view content from the content management system, to create a new item in the content management system to be authored corresponding to the entity, and so on.

Other operations can be performed based on the results that can occur outside of the context of the graphical user interface of the browser extension. For example, a notification can be generated, such as an electronic mail or text message, to a user if the system determines that the content management system has inadequate coverage of the subject matter found in an analyzed electronic document.

A variety of deployments of such a system are also possible in addition to or as alternatives to the example implementation described above.

For example, the browser extension can be configured to be installed on browsers of multiple user computers for multiple users in an organization, all of which have access to the content management system. The browser extensions can be configured to automatically process content on a set of selected sites and to provide an indication of the results of recent analyses of the selected sites. For example, when one of the selected sites is visited, the browser extension can display how well the content management system covers that subject matter of that site by way of the state indicator in the graphical user interface.

As another example, the browser extension can be operated as part of a different kind of computer program, such as a "crawler" application, or web site monitoring application, which provides for automated access to electronic documents. For example, such an application can be programmed to periodically check a website for changes, and invoke the browser extension when a selected website has changed.

Such a computer system can be implemented entirely as web services. The browser extension can itself be a web service that transmits notifications to user devices instead of providing a graphical user interface for an extension of a user's web browser.

As another example, in a computer system that supports multiple users, such as a group of editors of a commercial publisher, multiple browser extensions are deployed on multiple user computers and access the content management system of that publisher. In such a system, the activity of multiple users can be tracked, shared and used for more complex analyses of coverage, by content in the content management system, of a topic. In such a system, the results of such analyses also can be used to automated actions and/or generate notifications within the computer system.

In such a multiuser system, the system can track a set of known sites and characteristics about those sites. When a user is browsing sites using the browser application with the browser extension, if a visited site is in the set of known sites, it can be automatically processed. If the visited site is not in the set of known sites, the system can compare the structure of the site to characteristics of the known sites to determine whether the site may be of interested and can be processed in a manner similar to the known sites. For example, using machine learning techniques, characteristics of multiple sites or pages can be used to build a classifier using information about the known sites or pages. Any given site or page can be classified using such a classifier or a set of classifiers. A classification can indicate that the page is "of interest" for the purposes of subject matter coverage; a classification can indicate a type of page (home page, collection page, search result page, etc.). The characteristics that can help define a site are primarily its structural components, and patterns of content within those structural components. For example, a home page of a website generally has a set of short headlines near the top of the page, typically with a lead story with a large headline in a large font and associated video. When classified as a site of interest, a page can be processed to extract blocks of text based on the relevant structure of the document. With such a classifier, a new site can be identified as relevant, and the subject matter overlap with the content management system can be determined.

In such an implementation, the browser extension can determine, for any site visited by a user, whether the site is known, and whether the site is a site of interest to be processed by the analytics application. A new site of interest, after processing, can have its information added to a database for use by other users.

The analytics application, in addition to entity extraction, can include a component, or can access web service that includes a component, for performing other analyses on the content to incorporate into the recommendation of content from the content management system. For example, a topic area for the published electronic document can be determined, such as sports, politics, etc., and content matching this topic area can be ranked higher in the query results from the content management system. Other information that can be used for searching and ranking include but are not limited to sentiment from the content of the electronic document, sentiment of other users based on comments, likes and shares of the document, information about trending topics (e.g., entities related to trending topics can be given higher importance rankings).

The analytics application also can combine the results of analyzing multiple published electronic documents to provide a measure of coverage by the content management system of subject matter found in the multiple published documents. In commercial publishing, such an analysis is an indication of market coverage.

Such a system provides several benefits to reduce consumption of computer resources while improving productivity of those authoring content for publication on the internet. For example, the query results from the content management system can be used to quantify a gap in subject matter coverage between the published electronic document from the first source and content in the content management system supporting the second source. By identifying the entities or subject matter that contributes to the gap, the system can identify entities or subject matter for which content can be created, or for which content is available in the content management system, but not yet used, to overcome the gap.

The data about the gap in subject matter also can be used to drive content suggestion and action recommendations. For example, as editors create content, the gap analysis can suggest which items of content to use for stories, and can recommend action to create and publish stories using such content. Such content suggestions and action recommendations also can be based on machine learning models, for which user feedback can provide training input and improve such models. As another example, the system can automatically and frequently access and analyze various source of published documents to provide a continually updated measure of the gap in subject matter coverage, and subject matter recommendations. Such analyses can be aggregated for multiple users to optimize content suggestion. As a result of these various improvements, the consumption of computer resources, such as processing and network bandwidth, is improved by directing users to access and create content based on its relevance to the published electronic document being viewed.

Figure 9:
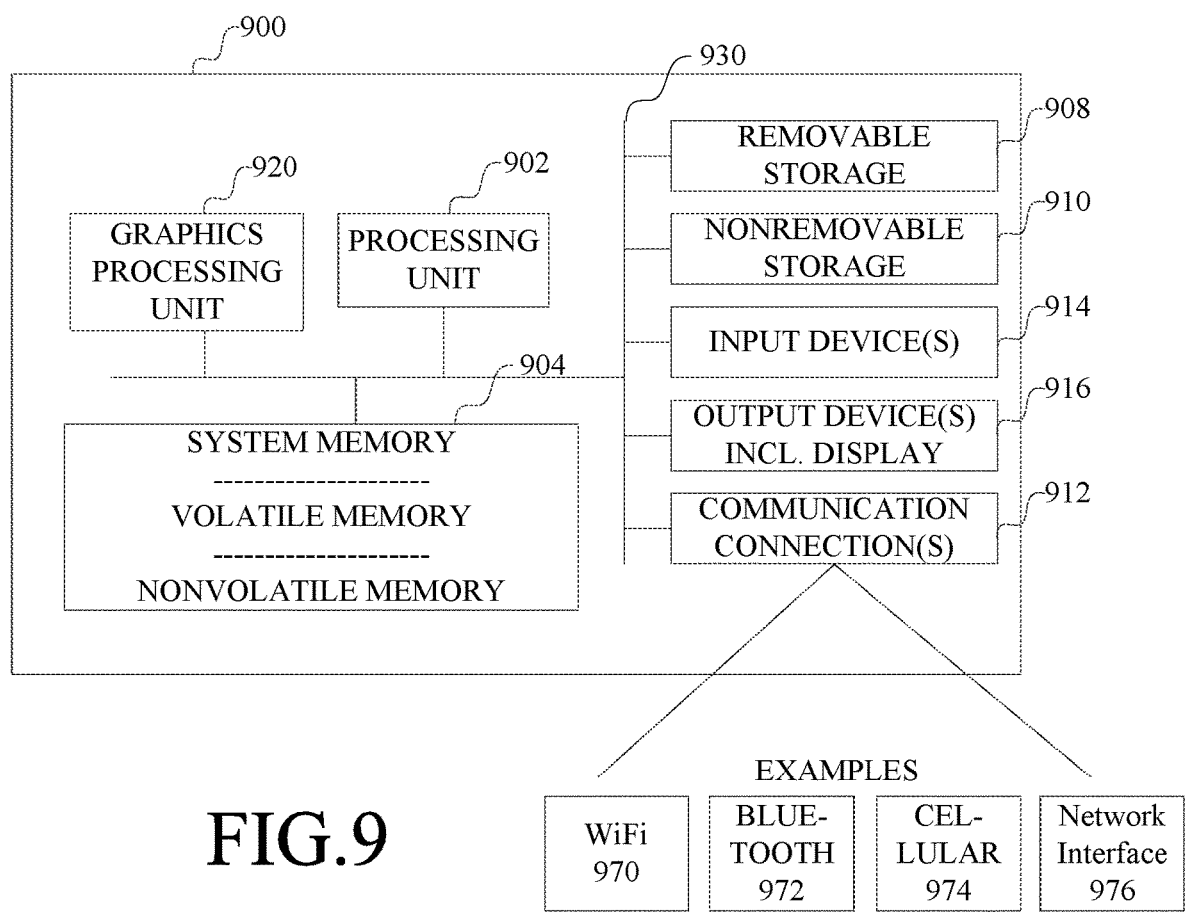
FIG. 9 is a block diagram of an example general purpose computer.

Having now described an example implementation, FIG. 9 illustrates an example of a computer with which components of the computer system of the foregoing description can be implemented. This is only one example of a computer and is not intended to suggest any limitation as to the scope of use or functionality of such a computer.

The computer can be any of a variety of general purpose or special purpose computing hardware configurations. Some examples of types of computers that can be used include, but are not limited to, personal computers, game consoles, set top boxes, hand-held or laptop devices (for example, media players, notebook computers, tablet computers, cellular phones including but not limited to "smart" phones, personal data assistants, voice recorders), server computers, multiprocessor systems, microprocessor-based systems, programmable consumer electronics, networked personal computers, minicomputers, mainframe computers, and distributed computing environments that include any of the above types of computers or devices, and the like.

With reference to FIG. 9, a computer 900 includes a processing system comprising at least one processing unit 902 and at least one memory 904. The processing unit 902 can include multiple processing devices; the memory 904 can include multiple memory devices. A processing unit 902 comprises a processor which is logic circuitry which responds to and processes instructions to provide the functions of the computer. A processing device can include one or more processing cores (not shown) that are multiple processors within the same logic circuitry that can operate independently of each other. Generally, one of the processing units in the computer is designated as a primary processor, typically called the central processing unit (CPU). Additional co-processing units 920, such as a graphics processing unit (GPU), also can be present in the computer. A co-processing unit comprises a processor that performs operations that supplement the central processing unit, such as but not limited to graphics operations and signal processing operations.

The memory 904 may include volatile computer storage devices (such as dynamic random access memory (DRAM) or other random access memory device), and non-volatile computer storage devices (such as a read-only memory, flash memory, and the like) or some combination of the two. A nonvolatile computer storage device is a computer storage device whose contents are not lost when power is removed. Other computer storage devices, such as dedicated memory or registers, also can be present in the one or more processors. The computer 900 can include additional computer storage devices (whether removable or non-removable) such as, but not limited to, magnetically-recorded or optically-recorded disks or tape. Such additional computer storage devices are illustrated in FIG. 1 by removable storage device 908 and non-removable storage device 910. Such computer storage devices 908 and 910 typically are nonvolatile storage devices. The various components in FIG. 1 are generally interconnected by an interconnection mechanism, such as one or more buses 930.

A computer storage device is any device in which data can be stored in and retrieved from addressable physical storage locations by the computer by changing state of the device at the addressable physical storage location. A computer storage device thus can be a volatile or nonvolatile memory, or a removable or non-removable storage device. Memory 904, removable storage 908 and non-removable storage 910 are all examples of computer storage devices. Some examples of computer storage devices are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage devices and communication media are distinct categories, and both are distinct from signals propagating over communication media.

Computer 900 may also include communications connection(s) 912 that allow the computer to communicate with other devices over a communication medium. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal. By way of example, and not limitation, communication media includes wired media, such as metal or other electrically conductive wire that propagates electrical signals or optical fibers that propagate optical signals, and wireless media, such as any non-wired communication media that allows propagation of signals, such as acoustic, electromagnetic, electrical, optical, infrared, radio frequency and other signals.

Communications connections 912 are devices, such as a wired network interface, wireless network interface, radio frequency transceiver, e.g., WiFi 970, cellular 974, long term evolution (LTE) or Bluetooth 972, etc., transceivers, navigation transceivers, e.g., global positioning system (GPS) or Global Navigation Satellite System (GLONASS), etc., transceivers, and network interface devices 976, e.g., Ethernet, etc., or other device, that interface with communication media to transmit data over and receive data from signal propagated over the communication media.

The computer 900 may have various input device(s) 914 such as a pointer device, keyboard, touch-based input device, pen, camera, microphone, sensors, such as accelerometers, thermometers, light sensors and the like, and so on. The computer 900 may have various output device(s) 916 such as a display, speakers, and so on. Such devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

The various computer storage devices 908 and 910, communication connections 912, output devices 916 and input devices 914 can be integrated within a housing with the rest of the computer, or can be connected through various input/output interface devices on the computer, in which case the reference numbers 908, 910, 912, 914 and 916 can indicate either the interface for connection to a device or the device itself as the case may be.

A computer generally includes an operating system, which is a computer program that, when executed, manages access, by other applications running on the computer, to the various resources of the computer. There may be multiple applications. The various resources include the memory, storage, input devices and output devices, such as display devices and input devices as shown in FIG. 1. To manage access to data stored in nonvolatile computer storage devices, the computer also generally includes a file system which maintains files of data. A file is a named logical construct which is defined and implemented by the file system to map a name and a sequence of logical records of data to the addressable physical locations on the computer storage device. Thus, the file system hides the physical locations of data from applications running on the computer, allowing applications to access data in a file using the name of the file and commands defined by the file system. A file system generally provides at least basic file operations such as creating a file, opening a file, writing a file or its attributes, reading a file or its attributes, and closing a file.

The various modules, tools, or applications, and data structures and flowcharts of FIGS. 1-8, as well as any operating system, file system and applications on a computer in FIG. 9, can be implemented using one or more processing units of one or more computers with one or more computer programs processed by the one or more processing units.

A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct or configure the computer to perform operations on data, or configure the computer to implement various components, modules or data structures.

Alternatively, or in addition, the functionality of one or more of the various components described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Accordingly, in one aspect, a computer system receives a published electronic document from a first source of published electronic documents. The computer system analyzes structure and content of the published electronic document to extract information. Such extracted information can include keywords, based on content, and information indicative of relative importance of those keywords, based on structure. The computer system generates queries based on the extracted information to query a content management system of a second source of published electronic documents. The results can indicate whether the content management has content available corresponding to the query and relevant to the published electronic document, and whether the available content is published in electronic documents available from the second source.

In another aspect, a computer-implemented process includes receiving a published electronic document from a first source of published electronic documents, and analyzing structure and content of the published electronic document to extract information. The process further includes generating queries, based on the extracted information, to query a content management system of a second source of published electronic documents. The results of the queries are processed to determine whether the content management has content available corresponding to the query, and whether the content is published in electronic documents available from the second source.

In another aspect, a computer system includes means for analyzing structure and content of a published electronic document from a first source to extract information, means for generating queries, based on the extracted information, to query a content management system of a second source of published electronic documents, and means for processing results of the queries to determine whether the content management has content available relevant to the published electronic document.

In any of the foregoing aspects, results of the queries can be processed, using data indicative of relative importance of the extracted information, to identify content available in the content management system corresponding to the query and relevant to the published electronic document, and whether the available content is published in electronic documents available from the second source.

In any of the foregoing aspects, information indicative of content available in the content management system and relevant to the published document and not yet published in electronic documents available from the second source can be communicated to a user of the analytics application.

In any of the foregoing aspects, results received from the queries to the content management system can be used for several purposes. For example, the results can quantify a gap in subject matter between the published electronic document and content published through the second source. The results can quantify a gap in subject matter between the published electronic document and content available in the content management system. The gap in subject matter can be used to recommend content from the content management system for use in electronic documents to be published through the second source.

In any of the foregoing aspects, the extracted information can include at least blocks of text associated with selected structural components of the electronic document. The blocks of text can be processed to extract keywords. The extracted keywords can be used to query the content management system.

In any of the foregoing aspects, the extracted information can include at least ranking information associated with the selected structural components of the electronic document.

In any of the foregoing aspects, to process results of the queries, a value representing overall coverage of subject matter of the electronic document can be computed based on at least the ranking information and content available in the content management system.

In any of the foregoing aspects, a graphical user interface can be provided including a graphical element representing state information corresponding to the computed value representing overall coverage of subject matter of the published electronic document.

Any of the foregoing aspects may be embodied as a computer system, as any individual component of such a computer system, as a process performed by such a computer system or any individual component of such a computer system, or as an article of manufacture including computer storage in which computer program instructions are stored and which, when processed by one or more computers, configure the one or more computers to provide such a computer system or any individual component of such a computer system.

It should be understood that the subject matter defined in the appended claims is not necessarily limited to the specific implementations described above. The specific implementations described above are disclosed as examples only.

What is claimed is:

1. A computer system for managing selection of content for publication, the computer system comprising:
  a processing system comprising a processing unit and storage, the storage including computer program instructions to configure the processing system to implement
  a content management system storing items of content, each item of content stored in the content management system comprising data indicating whether the item of content is published in electronic documents available from a second source of electronic documents, and
  an analytics application executed on the processing system and operative to
    send a request to retrieve a published electronic document from a first source of published electronic documents, the request comprising a resource identifier for the published electronic document,
    receive the published electronic document over a computer network from the first source of published electronic documents
    based on structure and content of the published electronic document, extract information from the published electronic document,
    generate queries, based on the information extracted, to query the content management system,
    receive, from the content management system, results of the queries,
    process the results of the queries to identify content available in the content management system corresponding to the queries and relevant to the published electronic document, and to identify whether the content available in the content management system is published in the electronic documents available from the second source of electronic documents, and
    communicate, to a user of the analytics application, information indicative of the content available in the content management system and relevant to the published electronic document and not yet published in the electronic documents available from the second source of electronic documents.

2. The computer system of claim 1, wherein the information extracted comprises at least blocks of text associated with selected structural components of the published electronic document.

3. The computer system of claim 2, wherein to extract information the processing system is further configured to process the blocks of text to extract keywords.

4. The computer system of claim 3, wherein to generate the queries the processing system is further configured to query the content management system using the keywords extracted.

5. The computer system of claim 2, wherein the information extracted comprises at least ranking information associated with the selected structural components of the electronic document.

6. The computer system of claim 5, wherein to process results of the queries, the processing system is further configured to compute a value representing overall coverage of subject matter of the published electronic document based on at least the ranking information and the content available in the content management system.

7. The computer system of claim 6, wherein the processing system is further configured to provide a graphical user interface including a graphical element representing state information corresponding to the value computed representing the overall coverage of the subject matter of the electronic document.

8. An article of manufacture, comprising:
  a computer storage device; and
  computer program instructions stored on the computer storage device, that when executed by a computer, comprising a processing unit and storage, configure the computer to:
    implement a content management system storing items of content, each item of content comprising data indicating whether the item of content is published in electronic documents available from a second source of electronic documents;
    send a request to retrieve a published electronic document from a first source of published electronic documents, the request comprising a resource identifier for the published electronic document;
    receive the published electronic document over a computer network from the first source of published electronic documents;
    based on structure and content of the published electronic document, extract information from the published electronic document;
    generate queries, based on the information extracted, to query the content management system;

process the results of the queries to identify content available in the content management system corresponding to the queries and relevant to the published electronic document, and to identify whether the content available in the content management system is published in the electronic documents available from the second source of electronic documents; and communicate information indicative of the content available in the content management system and relevant to the published electronic document and not yet published in the electronic documents available from the second source of electronic documents.

9. The article of manufacture of claim 8, wherein the information extracted comprises at least blocks of text associated with selected structural components of the electronic document.

10. The article of manufacture of claim 9, wherein the computer program instructions executable to configure the computer to extract information are executable to configure the computer to process the blocks of text to extract keywords.

11. The article of manufacture of claim 10, wherein the computer program instructions executable to configure the computer to generate the queries are executable to configure the computer to query the content management system using the keywords extracted.

12. The article of manufacture of claim 8, wherein the information extracted comprises at least ranking information associated with selected structural components of the published electronic document.

13. The article of manufacture of claim 12, wherein the computer program instructions executable to configure the computer to process the results of the queries comprise instructions executable to configure the computer to compute a value representing overall coverage of subject matter of the published electronic document based on at least the ranking information and the content available in the content management system.

14. The article of manufacture of claim 13, wherein the computer program instructions further configure the computer to provide a graphical user interface including a graphical element representing state information corresponding to the value computed representing the overall coverage of the subject matter of the published electronic document.

15. A computer-implemented process performed by a computer system comprising a processing unit and storage including computer program instructions that configure the computer system to perform the computer-implemented process, the computer-implemented process comprising:

sending a request to retrieve a published electronic document from a first source of published electronic documents, the request comprising a resource identifier for the published electronic document;

receiving the published electronic document over a computer network from the first source of published electronic documents;

based on structure and content of the published electronic document, extracting information from the published electronic document;

generating queries, based on the information extracted, to query a content management system, wherein the content management system stores content and is accessible for queries on the content, and wherein an item of stored content has data indicating whether the item is published in electronic documents available from a second source;

receiving, from the content management system, results of the queries;

processing the results of the queries to identify content available in the content management system corresponding to the queries and relevant to the published electronic document, and to identify whether the content available in the content management system is published in the electronic documents available from the second source; and communicating information indicative of the content available in the content management system and relevant to the published electronic document and not yet published in the electronic documents available from the second source of electronic documents.

16. The computer-implemented process of claim 15, wherein the information extracted comprises at least blocks of text associated with selected structural components of the published electronic document.

17. The computer-implemented process of claim 16, wherein extracting information comprises processing the blocks of text to extract keywords.

18. The computer-implemented process of claim 17, wherein generating the queries comprises querying the content management system using the keywords extracted.

19. The computer-implemented process of claim 15, wherein the information extracted comprises at least ranking information associated with selected structural components of the published electronic document.

20. The computer-implemented process of claim 19, wherein processing the results of the queries comprises computing a value representing overall coverage of subject matter of the published electronic document based on at least the ranking information and the content available in the content management system.

* * * * *